United States Patent
Kemp et al.

(10) Patent No.: US 8,606,384 B2
(45) Date of Patent: Dec. 10, 2013

(54) METHOD FOR DERIVING ANIMATION PARAMETERS AND ANIMATION DISPLAY DEVICE

(75) Inventors: Thomas Kemp, Esslingen (DE); Jana Eggink, Stuttgart (DE); Wilhelm Hagg, Korb (DE); Franck Giron, Waiblingen (DE); Taufan Zimmer, Stuttgart (DE)

(73) Assignee: Sony Corporation, Tokyo (JP)

( * ) Notice: Subject to any disclaimer, the term of this patent is extended or adjusted under 35 U.S.C. 154(b) by 618 days.

(21) Appl. No.: 12/864,413

(22) PCT Filed: Jan. 14, 2009

(86) PCT No.: PCT/EP2009/000178
§ 371 (c)(1),
(2), (4) Date: Oct. 18, 2010

(87) PCT Pub. No.: WO2009/092538
PCT Pub. Date: Jul. 30, 2009

(65) Prior Publication Data
US 2011/0029112 A1    Feb. 3, 2011

(30) Foreign Application Priority Data

Jan. 23, 2008    (EP) .................................... 08001227

(51) Int. Cl.
*G06F 17/00* (2006.01)
*G06F 3/00* (2006.01)
(52) U.S. Cl.
USPC .............................. 700/94; 715/202; 715/716
(58) Field of Classification Search
CPC .................... G06F 17/30743; G10H 2240/085
USPC ............ 700/94; 715/202, 207, 231, 233, 716, 715/970.1, 978
See application file for complete search history.

(56) References Cited

U.S. PATENT DOCUMENTS

| | | | |
|---|---|---|---|
| 4,081,829 A * | 3/1978 | Brown | 381/56 |
| 6,359,622 B1 * | 3/2002 | Hayes-Roth | 345/474 |
| 6,411,289 B1 | 6/2002 | Zimmerman | |
| 7,764,311 B2 * | 7/2010 | Bill | 348/222.1 |
| 8,478,781 B2 * | 7/2013 | Tateno | 707/780 |

(Continued)

FOREIGN PATENT DOCUMENTS

| | | |
|---|---|---|
| CN | 1710613 A | 12/2005 |
| CN | 1971621 A | 5/2007 |

(Continued)

OTHER PUBLICATIONS

Office Action issued Aug. 24, 2012 in Chinese Patent Application No. 200980102937.7 (with English-language translation).

(Continued)

*Primary Examiner* — Jesse Elbin
(74) *Attorney, Agent, or Firm* — Oblon, Spivak, McClelland, Maier & Neustadt, L.L.P.

(57) ABSTRACT

Method for deriving at least one animation parameter from audio data, said animation parameters being descriptive of the mood of said audio data, comprising the following steps: determining a current mood model for said audio data; calculating at least one distance measure for at least one reference mood model, wherein said distance measure represents the distance between said current mood model and the respective reference mood model; setting of at least one animation parameter depending on said distance measure.

16 Claims, 3 Drawing Sheets

(56) References Cited

U.S. PATENT DOCUMENTS

| | | | |
|---|---|---|---|
| 2003/0014215 A1* | 1/2003 | Sugiyama et al. | ............ 702/176 |
| 2003/0057884 A1 | 3/2003 | Dowling et al. | |
| 2004/0264917 A1 | 12/2004 | Braun et al. | |
| 2005/0275626 A1 | 12/2005 | Mueller et al. | |
| 2007/0157795 A1 | 7/2007 | Hung | |
| 2008/0066611 A1* | 3/2008 | Makino | ............ 84/609 |
| 2009/0031882 A1 | 2/2009 | Kemp et al. | |

FOREIGN PATENT DOCUMENTS

| | | | | |
|---|---|---|---|---|
| CN | 1985302 A | | 6/2007 | |
| EP | 1 615 204 | | 1/2006 | |
| EP | 1 703 491 | | 9/2006 | |
| WO | 2005 084339 | | 9/2005 | |
| WO | WO 2006/097299 | * | 9/2006 | ............ G10L 11/00 |

OTHER PUBLICATIONS

Chinese Office Action issued Nov. 29, 2012 in Patent Application No. 200980102937.7 with English Translation.

Chinese Office Action issued Mar. 20, 2012 in Patent Application No. 200980102937.7 with English Translation.

Dipaola, Steve et al., "Emotional Remapping of Music to Facial Animation", Preprint for ACM SIGGRAPH '06 Video Game Symposium Proceedings, 7 pages, XP002473983, (2006).

Liu, Dan et al., "Automatic Mood Detection from Acoustic Music Data", International Symposium on Music Information Retrieval, 7 pages, XP002473984, (2003).

Kubelka, Ondrej: "Interactive Music Visualization", Central European Seminar on Computer Graphics, 4 pages, XP002275883, (May 3, 2000).

Yang, Yi-Hsuan et al., "Music Emotion Classification: A Fuzzy Approach", MM'06, pp. 81-84, XP002473985, (2006).

Mion, Luca et al., "Music Expression Understanding Based on a Joint Semantic Space", AI*IA, LNAI, pp. 614-625, vol. 4733, XP019069966, ISBN: 978-3-540-74781-9, (2007).

Wang, Muyuan et al., "User-Adaptive Music Emotion Recognition", ICSP, '04 Proceedings, IEEE, pp. 1352-1355, XP010810650, ISBN: 0-7803-8406-7, (2004).

Aucouturier, Jean-Julien et al., "Music Similarity Measures: What's the Use"?, Proceeding of the 3$^{rd}$ International Conference on Music Information Retrieval ISMIR, pp. 157 to 163, (2002).

* cited by examiner

METHOD FOR DERIVING ANIMATION PARAMETERS AND ANIMATION DISPLAY DEVICE

TECHNICAL FIELD

The invention relates to a method for deriving animation parameters from audio data, to an animation display device and to an animation device.

BACKGROUND

When music is being played on a device which has a screen, the music might be animated, i.e. visualized, on the screen. An example of related art is the Microsoft Windows media player which offers a wide variety of animations from spectrograms to flying objects which are all controlled by the music being played.

However, animation of music in prior art systems is often perceived by the user as being boring or not matching to the music.

It is, therefore, an object of the invention to provide a method for deriving animation parameters from audio data, an animation display device and an animation device overcoming this drawback.

SUMMARY OF THE INVENTION

In order to solve this objective, the present invention provides a method for deriving animation parameters from audio data. Further, the invention provides an animation display device and an animation device.

The method for deriving animation parameters from audio data, said animation parameters being descriptive of the mood, emotion and character of said audio data, may comprise the following steps: determining a current mood model for said audio data, said current mood model being descriptive of the mood of said audio data, calculating at least one distance measure for at least one distinct reference mood model, wherein said distance measure represents the distance between said current mood model and the respective reference mood model, and setting of at least one animation parameter depending on said distance measure. The term "animation" used throughout the specification may also be seen as "visualization", i.e. the animation/visualization parameters may be used for visualizing the mood of the audio data. Therefore, said animation parameters may be used for controlling an animation of the audio data, e.g. music, in the form of light, color, graphics or the like depending on the type and/or mood of audio data which is animated.

Said distance measure may be calculated as e.g. described in "Music similarity measures: What's the use?" by J. J. Aucouturier and F. Pachet, in Proceedings of the $3^{rd}$ international conference on music information retrieval ISMIR 2002, pages 157 to 163. Said distance measure may also be calculated as described in EP1615204 (=EP-Application No. 04 016 229) the contents of which is hereby included by reference.

The computation of the current mood model and also the computation of the reference mood models are also explained in EP 1 615 204. The audio data that shall be used to compute the reference mood models in the way described by EP 1 615 204 may be a application dependent, and could e.g. be selected by choosing songs which are labeled manually for a specific attribute, like e.g. happy.

The animation display device for deriving animation parameters from audio data, said animation parameters being descriptive of the mood of said audio data, may comprise means for determining a current mood model for said audio data, means for calculating at least one distance measure for at least one specific/distinct reference mood model, wherein said distance measure represents the distance between said current mood model and the respective reference mood model, means for setting of at least one animation parameter depending on said distance measure, and means for displaying graphics that are changing depending on said animation parameter.

Said animation device for animating audio data may comprise an audio input interface adapted to receive audio data, an audio data processor adapted to determine a current mood model for said audio data and further adapted to calculate at least one distance measure for at least one specific/distinct reference mood model, wherein said distance measure represents the distance between said current mood model and the respective reference mood model, and further being adapted to said at least one animation parameter depending on said distance measure, and a display adapted to display graphics that are changing depending on said animation parameter.

All embodiments mentioned in conjunction with the method may also be applied for said animation display device and said animation device and vice versa.

DETAILED DESCRIPTION OF THE INVENTION

Figure 1:
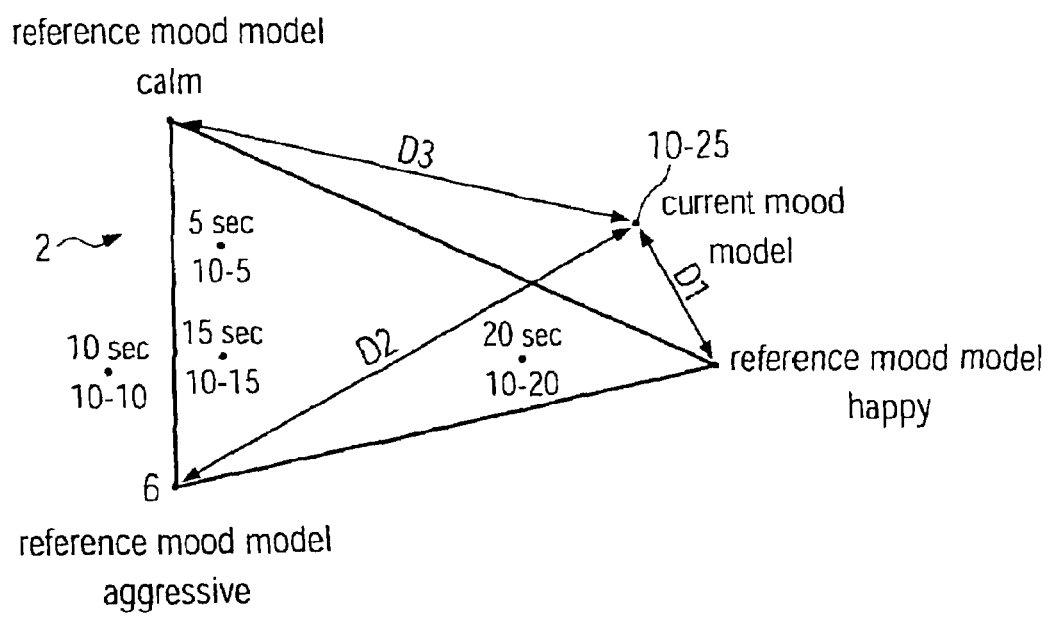
FIG. 1 shows a mood space with different reference mood models.

One possible application of the method for deriving said animation parameter is to use the obtained animation parameters for animation or visualization of audio data, i.e. music. In this case, the animation parameters are used to control parameters influencing the visualization, e.g. a change in graphics, a change in color, a change of moving speed of graphics, a change of shape of graphics.

It is possible to associate one animation parameter with one distance measure and setting said animation parameter depending on the associated distance measure. For example, as animated graphic fish, e.g. a school of fish, could be used. The swimming speed of the fish could be controlled by one animation parameter and corresponding distance measure, whereas the color of the fish might be controlled by another animation parameter. Further, the species of fish might be controlled by yet another animation parameter. If, for example the distance is short to a reference mood model of "aggressive" shark could be used as type of fish, whereas, if the distance is short to a reference mood model of "calm", then clown (anemone) fish could be used.

When setting said animation parameter, it is possible that one animation parameter is set based on a function of a plurality of distance measures. For example, a function like "average of D1 and D2, divided by D3" may be used. Using a principle component analysis (PCA) is essentially the same as this, with the matrix multiplication of the distances Dx with the respective column of the PCA matrix being the "function of a plurality of distance measures".

When setting said animation parameter, it is possible to set said animation parameter using a mapping table. An example of a mapping table is given in the following:

| VALUE of distance measure | Animation |
| --- | --- |
| <0.02 | Fish sinks to ground and stops moving |
| 0.02 ... 0.5 | Fish moves with v = VALUE * 3 m/s |
| 0.5 ... 0.9 | Fish moves with v = VALUE * 4.5 m/s |
| >0.9 | Fish jumps in and out of the water |

Said method may also comprise determining audio segments of predefined or varying length from said audio data and determining said current mood model for at least one of said audio segments. In this case, said animation parameters may be set, i.e. changed or adapted, for each audio segment when the segment is being played to a user. Therefore, a current mood model may be determined e.g. every five seconds. In this case the current mood model would correspond to the mood of the audio data corresponding to the time period between the beginning and end of the corresponding audio segment. When playing the audio data to a user, the animation that can be controlled by the animation parameters may therefore change for each audio segment that is currently being played to the user.

In other words, said animation parameters may be set when a corresponding audio segment is currently being played to a user, such that an animation that is based on said animation parameter matches the currently played audio segment. As will be detailed below, the animation parameters may be determined offline, i.e. before the audio data is being played to a user. In this case, said animation parameters may be stored in a memory together with timing information indicating the start and end of the corresponding audio segment within said audio data.

It is also possible to determine said current mood model of a corresponding audio segment depending on at least one previous mood model of at least one previous audio segment. Thus, a current mood model is determined depending on a previous mood model thereby avoiding erratic behavior of the animation. For example, in the case of short analysis windows, i.e. short audio segments, smoothing of the resulting mood space trajectory in this way may be performed. This may be done e.g. by computing the new mood space point, i.e. a current mood model, by averaging e.g. the previous ten or twenty mood space point locations, i.e. previous mood models. Thereby, a lower emphasize may be put on older mood space locations, i.e. previous mood models, e.g. by applying an exponential weighting function or the like.

In other words, when determining said current mood model, a first previous mood model corresponding to a first audio segment may have a higher influence on said current mood model than a second previous mood model corresponding to a second audio segment, said first audio segment being subsequent to said second audio segment. Said first audio segment and said second audio segment need not be adjacent to each other, i.e. there may be other audio segments in between said first audio segment and said second audio segment.

As mentioned, said influence may be determined by applying an exponential weighting function.

Further, it is possible that said distance measure is calculated for a plurality of reference mood models, and said method comprises applying a principle component analysis (PCA), linear transformation to said plurality of distance measures in order to remove a correlation existing in between said plurality of distance measures. The distances may be seen as coordinates in a mood space which is defined by the reference mood models. The mood space, however, is skewed and occupation is not uniform, as—depending on the selected reference mood models—there are quite a few strongly correlated dimensions in it. If this correlation is not desired, it is possible to remove it by applying e.g. a PCA linear transformation to the distance measures.

Said method may also be performed offline and said method may comprise storing said animation parameter. As mentioned, in this case, timing information may be stored together with said animation parameter indicating the position of a corresponding audio segment within said audio data.

As mentioned, said method may be used for animating a graphic, and therefore, said method may comprise displaying a graphic to a user and changing said graphic depending on said animation parameter. It is, therefore, possible to modify the animation of the graphic based on the coordinates in the mood space or in the transformed mood space. It is e.g. possible to directly control one animation parameter, e.g. the color of fish, by one dimension of the mood space, and one other animation parameter, e.g. swimming speed of fish, by another dimension. More complex scenarios could map the mood space coordinates by means of function of mapping tables to the animation controls.

Thus, said graphic may comprise at least one moving object and said method may comprise changing a moving speed of said moving object depending on a first animation parameter, and changing a color and/or type of said moving object depending on a second animation parameter.

In FIG. 1, a mood space 2 is shown. Within said mood space 2, a reference mood model for the mood "calm" 4, a reference mood model for the mood "aggressive" 6 and a reference mood model for the mood "happy" 8 are located. Said reference mood models 4, 6 and 8 may be seen as "anchor moods" that have been predetermined.

In the example of FIG. 1, the audio data is segmented into audio segments of a predefined length of five seconds. Therefore, every five seconds a current mood model 10 is determined, i.e. for the first audio segment corresponding to the first five seconds of audio data, a first current mood model 10-5 is determined. Further, for the second five seconds of the audio data, i.e. for a second audio segment, a second current mood model 10-10 is determined. Further, for a third, fourth and fifth audio segment, current mood models 10-15, 10-20 and 10-25 are determined, respectively.

In the example of FIG. 1, the animation parameters are determined for current mood model 10-25. Therefore, for said current mood model 10-25, a first distance measure D1, a second distance measure D2 and a third distance measure D3 are determined. Said first distance measure D1 represents the distance between said current mood model 10-25 and said reference mood model happy 8. Said second distance measure D2 represents the distance between said current mood model 10-25 and said reference mood model aggressive 6. Said third distance measure D3 represents the distance between said current mood model 10-25 and said reference mood model calm 4.

In one embodiment, it is possible to control one animation parameter by one distance measure. Therefore, e.g. said second distance measure D2 may be used for controlling the swimming speed of fish, whereas said third distance measure D3 may be used for controlling the color and/or type of the fish.

It is possible to determine said current mood model 10-25 in the example of FIG. 1 depending on previous mood models. In the example of FIG. 1, the mood models 10-5, 10-10, 10-15 and 10-20 are previous mood models with respect to the current mood model 10-25. Therefore, the current mood models 10-25 may be determined depending on the mood models 10-5 to 10-20. This can be done by e.g. averaging the previous mood models 10-5 to 10-20. Thereby, a lower emphasize may be put on the previous mood models, for example by applying an exponential weighting function.

Figure 2:
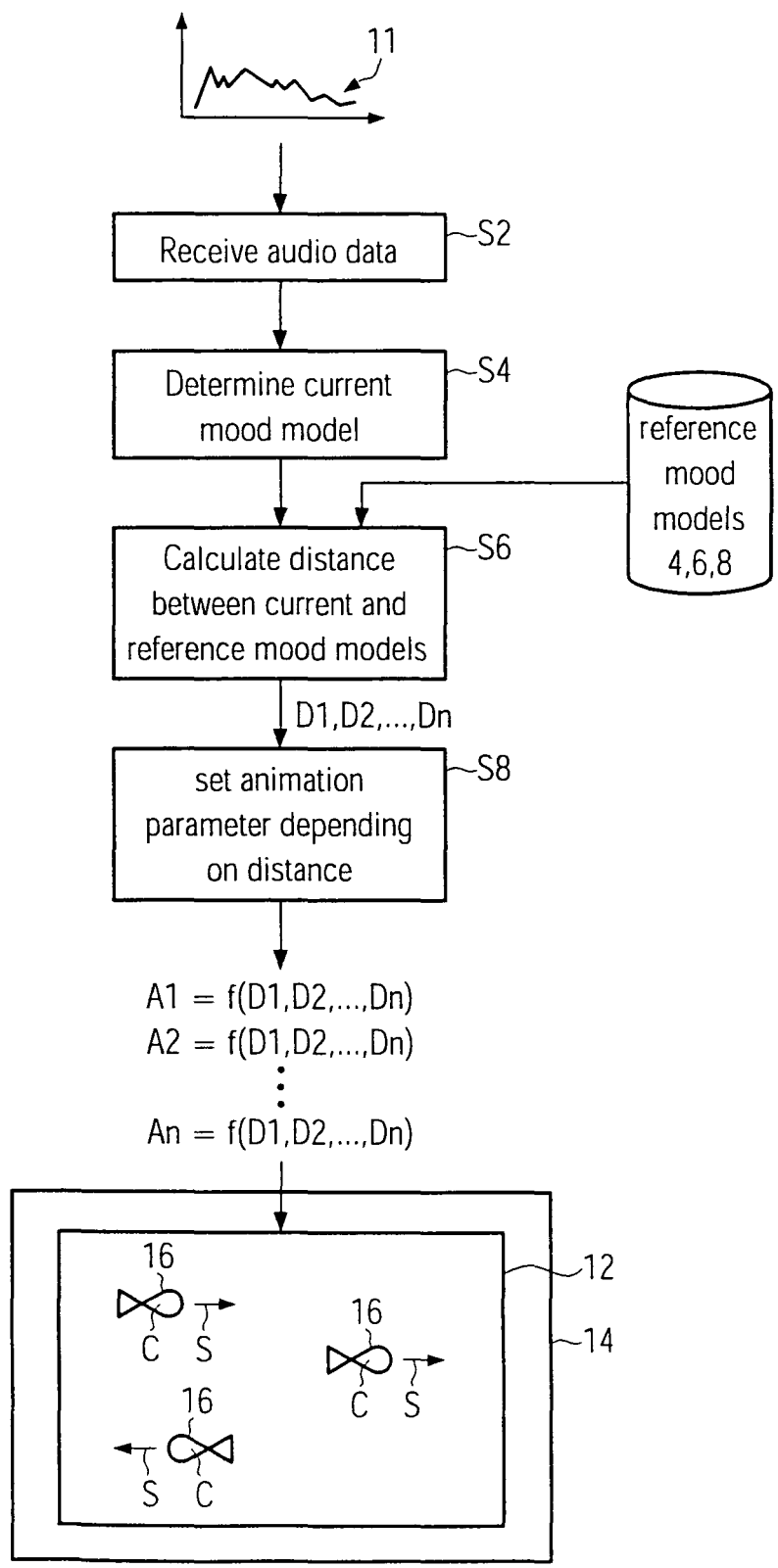
FIG. 2 shows a flowchart illustrating the different steps for deriving animation parameters.

FIG. 2 shows a flowchart comprising a receiving step S2, a first processing step S4, a second processing step S6 and a setting step S8.

In said receiving step S2, audio data 11 are received. Said audio data may be analog or digital audio data. It is also possible that said audio data 11 correspond to an audio data stream.

In said first processing step S4, a current mood model is determined for said audio data 11.

In one embodiment, within said receiving step S2, said audio data 11 may be segmented into audio segments. In this case, within said first processing step S4, a current mood model may be determined for a respective audio segment.

Within said second processing step S6, distance measures D1, D2, . . . , Dn are calculated for each of the reference mood models.

Within said setting step S8, the calculated distance measures D1 to Dn are used to set animation parameters A1, A2, . . . , An depending on said distance measures D1, D2, . . . , Dn.

In one embodiment, a first animation parameter A1 may be determined depending on the first distance measure D1, a second animation parameter A2 may be determined depending on the second distance measure D2 and so on. Alternatively, the animation parameters A1, A2, . . . , An may also be determined depending on several or all of the distance measures D1, D2, . . . , Dn. For example, A1 may depend on all of the distance measures D1, D2, Dn or depending on selected distance measures.

On the bottom of FIG. 2, an animation device 14 having a display 12 is shown. On said display 12, moving fish 16 are shown. Said fish 16 move with a speed S and have a color C. In one embodiment, the speed S of said fish 16 may be controlled by said first animation parameter A1 and the color C of said fish 16 may be controlled by said second animation parameter A2.

Figure 3:
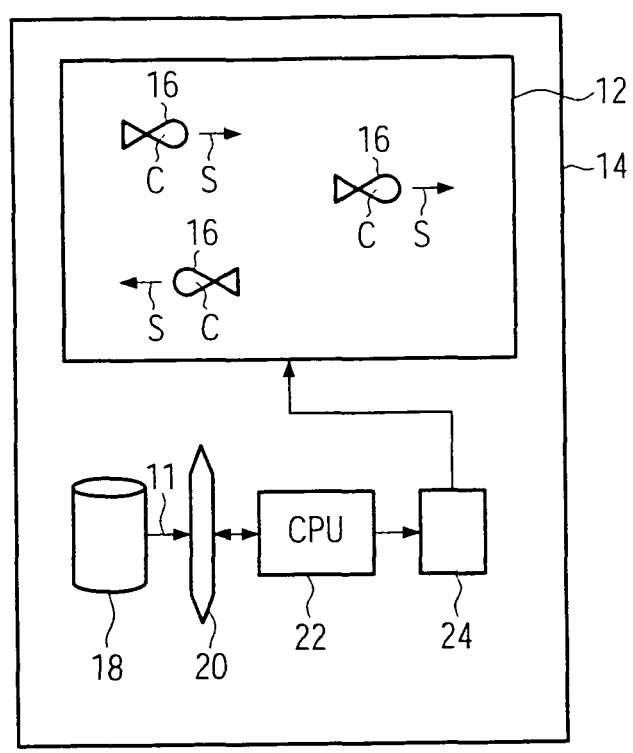
FIG. 3 shows an animation device.

FIG. 3 shows said animation device 14 having an audio data storage 18 for storing audio data. Said animation device 14 may be a handheld, i.e. mobile, device that a user can carry around and enjoy the animation while listening to his music collection stored in the audio data storage 18.

Said animation device 14 further comprises an audio input interface 20 which can e.g. be a data bus for exchanging data between said audio data storage 18 and an audio data processor 22, which can e.g. be a central processing unit CPU. Said audio data processor 22 may receive audio data 11 from said audio data storage 18 via said audio input interface 20 and determine a current mood model for said audio data and further calculate a distance measure for a reference mood model. Further, said audio data processor 22 may set an animation parameter depending on the calculated distance measure. The animation parameter may be used by a graphic processor 24 to control graphics displayed on the display 12. In the example of FIG. 3, the graphics are fish 16 moving at a certain speed S and having a certain color C. The speed S may be controlled by a first animation parameter, whereas the color of the fish 16 may be determined by another animation parameter.

The following elucidations may help the person skilled in the art to get a better understanding of the invention or details or background thereof.

When music is being played on a device with a screen or a display, the mood of the music that is being played may influence an animated graphic being displayed on the screen/display, i.e. a visualization of the music on this device may be provided. If a song has various different emotions, i.e. moods, in its parts, i.e. in different audio segments, the animation may change accordingly. Possible animations include bars of different height, indicating the dimensions of mood or animated creatures like e.g. fish which change color, behavior or species of fish. The animated parameter, e.g. species of fish, is coupled to a mood model and the proximity of the musical segment or the song in its whole to this specific mood model in comparison to the proximity to the other mood models governs the behavior of the animation.

As regards related art, the most famous example is the lightning control in discothèques and clubs, where the light is controlled basically according to the energy of the music.

The current mood model may be detected based on timbre similarity. Thereby, pre-computed or user-defined mood models are compared with the unknown song and the distances to the class representatives, i.e. to the reference mood models, are taken as coordinates in a mood space.

It is possible to dynamically compute musical mood for a music piece, either during playback or in advance, i.e. offline, with storing the relevant mood information and using the current mood possibly in a smoothed way (a smoothed trajectory through mood space) as a control for a visible animation.

The visible animation, i.e. graphics, can be of many kinds, like e.g. a pool of colorful fish of various species which behave differently, happily dancing and playing for happy music, calmly enjoying the warm water for calm music or aggressively chasing each other for aggressive music and so on. The visible animation may also be an array of colored bars where the height of the bars indicates the strength of one dimension of mood.

Therefore, a set of predefined anchor moods, i.e. reference mood models, may be defined, which reference mood models are associated with the dimensions of an underlying mood space, wherein the mood space is defined by the reference mood models. For every time segment, i.e. audio segment, of a song that is being played, where the audio segments are sampled continuously and could vary in length from one second to the range of minutes, the distance of the respective audio segment to each of the reference mood models is computed. Such distance computation can be done as e.g. described in EP1615204 or as described in "Music similarity measures: What's the use?" by J. J. Aucouturier and F. Pachet, in Proceedings of the 3$^{rd}$ international conference on music information retrieval ISMIR 2002, pages 157 to 163. As a result, there are as many distances, i.e. distance measures, to the reference mood models as there are reference mood models. The number of reference mood models is application-dependent and will in most cases vary between three and ten or so.

The distances serve as coordinates in the mood space, wherein the space may be regarded as skewed and the occupation may not be uniform, as—depending on the selected reference mood models—there are quite a few strongly correlated dimensions in the mood space. If this correlation is not desired, it can be removed by applying e.g. a principle component analysis (PCA) linear transformation to the distances.

Based on the coordinates in the mood space or in a transformed mood space, the animation is modified. This can e.g. be done by directly controlling one animation parameter, e.g. fish color, by one dimension of the mood space, and one other animation parameter, e.g. swimming speed of fish, by another dimension. More complex scenarios are also possible, wherein the mood space coordinates are mapped by means of functions or mapping tables to the animation controls, i.e. animation parameters.

To avoid erratic behavior of the animation, e.g. in the case of short analysis windows, i.e. when said audio segments are rather short, it is advantageous to smooth the resulting mood space trajectory. This can be done, e.g. by computing the mood space point, i.e. the current mood model, by averaging the previous, i.e. last, twenty mood space point locations with the location of the current mood space point. Of course less or more mood space point locations may be used, e.g. ten, or thirty or forty or more points. By averaging previous mood models, a lower emphasize may be put on older mood space locations, i.e. previous mood models, by e.g. applying an exponential weighting function.

The invention claimed is:

1. A method for deriving at least one animation parameter from audio data, said animation parameter being descriptive of the mood of said audio data, comprising:
    determining a current mood model for said audio data;
    calculating a distance measure between said current mood model and each of at least two reference mood models;
    setting a first animation parameter depending on said distance measure between said current mood model and a first reference mood model and setting a second animation parameter depending on said distance measure between said current mood model and a second reference mood model.

2. The method according to claim 1, wherein when setting said first animation parameter, the first animation parameter is set based on a function of a plurality of distance measures.

3. The method according to claim 1, wherein, when setting said first animation parameter, said first animation parameter is set using a mapping table.

4. The method according to claim 1, further comprising:
    determining audio segments of predefined length from said audio data;
    determining said current mood model for at least one of said audio segments; and
    setting said animation parameters for each audio segment.

5. The method according to claim 4, wherein said animation parameters are set when a corresponding audio segment is currently being played to a user, such that an animation that is based on said first animation parameter matches the currently played audio segment.

6. The method according to claim 4, comprising:
    determining said current mood model of a corresponding audio segment depending on at least one previous mood model of at least one previous audio segment.

7. The method according to claim 6, wherein, when determining said current mood model, a first previous mood model corresponding to a first audio segment has a higher influence on said current mood model than a second previous mood model corresponding to a second audio segment, said first audio segment being subsequent to said second audio segment.

8. The method according to claim 7, comprising:
    determining said influence by applying an exponential weighting function.

9. The method according to claim 1, wherein said distance measure is calculated for a plurality of reference mood models, and said method further comprises
    applying a principle component analysis (PCA) linear transformation to said plurality of distance measures in order to remove a correlation existing in between said plurality of distance measures.

10. The method according to claim 1, wherein said method is performed offline, and said method comprises storing said first animation parameter.

11. The method according to claim 1, comprising:
    displaying a graphic to a user; and
    changing said graphic depending on said first animation parameter and said second animation parameter.

12. The method according to claim 11, wherein said graphic comprises at least one moving object and said method comprises:
    changing a moving speed of said moving object depending on the first animation parameter; and
    changing a color and/or the type of said moving object depending on the second animation parameter.

13. An animation display device for deriving at least one animation parameter from audio data, said animation parameter being descriptive of the mood of said audio data, comprising:
    means for determining a current mood model for said audio data;
    means for calculating distance measure between said current mood model and each of at least two reference mood models;
    means for setting a first animation parameter depending on said distance measure between said current mood model and a first reference mood model and setting a second animation parameter depending on said distance measure between said current mood model and a second reference mood model; and
    means for displaying graphics that are changing depending on said first animation parameter and said second animation parameter.

14. The animation display device according to claim 13, further comprising:
    means for determining audio segments of predefined length from said audio data, wherein said means for determining a current mood model determines said current mood model for at least one of said audio segments, and said means for setting said animation parameters sets said animation parameters for each audio segment.

15. The animation display device according to claim 14, wherein said animation parameters are set when a corresponding audio segment is currently being played to a user, such that said graphics match the currently played audio segment.

16. An animation device for animating audio data, comprising:
    an audio input interface adapted to receive audio data;
    a data processor adapted to
        determine a current mood model for said audio data,
        calculate a distance measure between said current mood model and each of at least two reference mood models, and
        set a first animation parameter depending on said distance measure between said current mood model and a first reference mood model and setting a second animation parameter depending on said distance measure between said current mood model and a second reference mood model; and
    a display adapted to display graphics that are changing depending on said first animation parameter and said second animation parameter.

* * * * *